United States Patent [19]

Mooring

[11] Patent Number: 5,558,118

[45] Date of Patent: Sep. 24, 1996

[54] SYSTEM FOR REMOTELY CONTROLLING THE UNREELING AND TAKE-UP OF A HOSE ON A REEL

[76] Inventor: Jonathon E. Mooring, 9944 Bon Vue Dr., El Cajon, Calif. 92021

[21] Appl. No.: 453,784

[22] Filed: May 30, 1995

[51] Int. Cl.⁶ .............................. B66F 9/06; A62C 5/00
[52] U.S. Cl. .................. 137/342; 137/351; 137/355.12; 137/355.26; 251/129.04
[58] Field of Search .................................. 137/615, 342, 137/351, 355.12, 355.16, 355.26, 899

[56] References Cited

U.S. PATENT DOCUMENTS

| | | | |
|---|---|---|---|
| 2,787,278 | 4/1957 | Mitchell | 137/351 |
| 2,997,721 | 8/1961 | Hopfeld | 137/351 |
| 3,205,951 | 9/1965 | Pyles | 137/355.26 |
| 3,648,720 | 3/1972 | Kornahrens | 137/351 |
| 3,799,869 | 2/1974 | Morris | 137/351 |
| 4,886,282 | 12/1989 | Wilkinson et al. | 137/351 |

*Primary Examiner*—A. Michael Chambers
*Attorney, Agent, or Firm*—Charles C. Logan, II

[57] ABSTRACT

A system for remotely controlling the un-reeling and take-up of a hose on a reel that is primarily designed to be used in combination with a crane truck upon which the reel would be mounted. A turntable platform that is rotatable about a vertical axis is supported on a base secured to the bed of the truck. A telescoping boom assembly has its bottom end pivotally secured to support structure on the turntable platform. A hydraulic lift cylinder assembly is mounted on the turntable platform and its top end is secured to the telescoping boom assembly for raising and lowering it. The novel reel is mounted on the turntable platform and it has a hose having its bottom end coiled thereon. The hose has a high pressure pneumatic line running through its interior and this is surrounded by a plurality of medium delivery lines. A pair of fiber optic lines are also inside the hose and their bottom ends are connected to a base modem and their top ends are connected to a satellite modem. The high pressure line is connected to an air compressor and its top end has a connection to which different pneumatic power tools can be attached. The medium delivery lines are connected to containers such as paint, pesticides, oxygen, etc. The top ends of the lines have connections to which tools can be attached. An insulated boom extension is connected to the top boom section and it has a sheave mounted adjacent its top end. The hose passes over the sheave and drops downwardly to a connection housing which houses the satellite modem and the connections for the auxiliary medium delivery lines. An operator is supported on a tree saddle that is clipped to the connection housing. The operator has a control console that he connects to the satellite modem and this would put him in control of the various actions he wishes to occur.

24 Claims, 4 Drawing Sheets

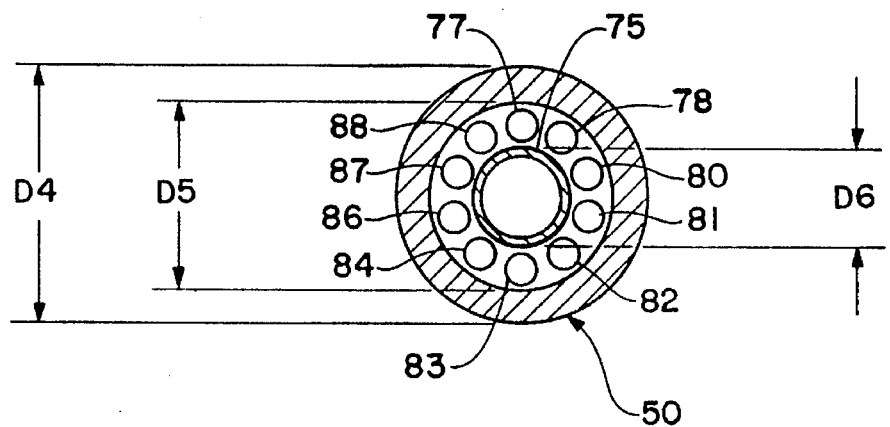
FIGURE 5
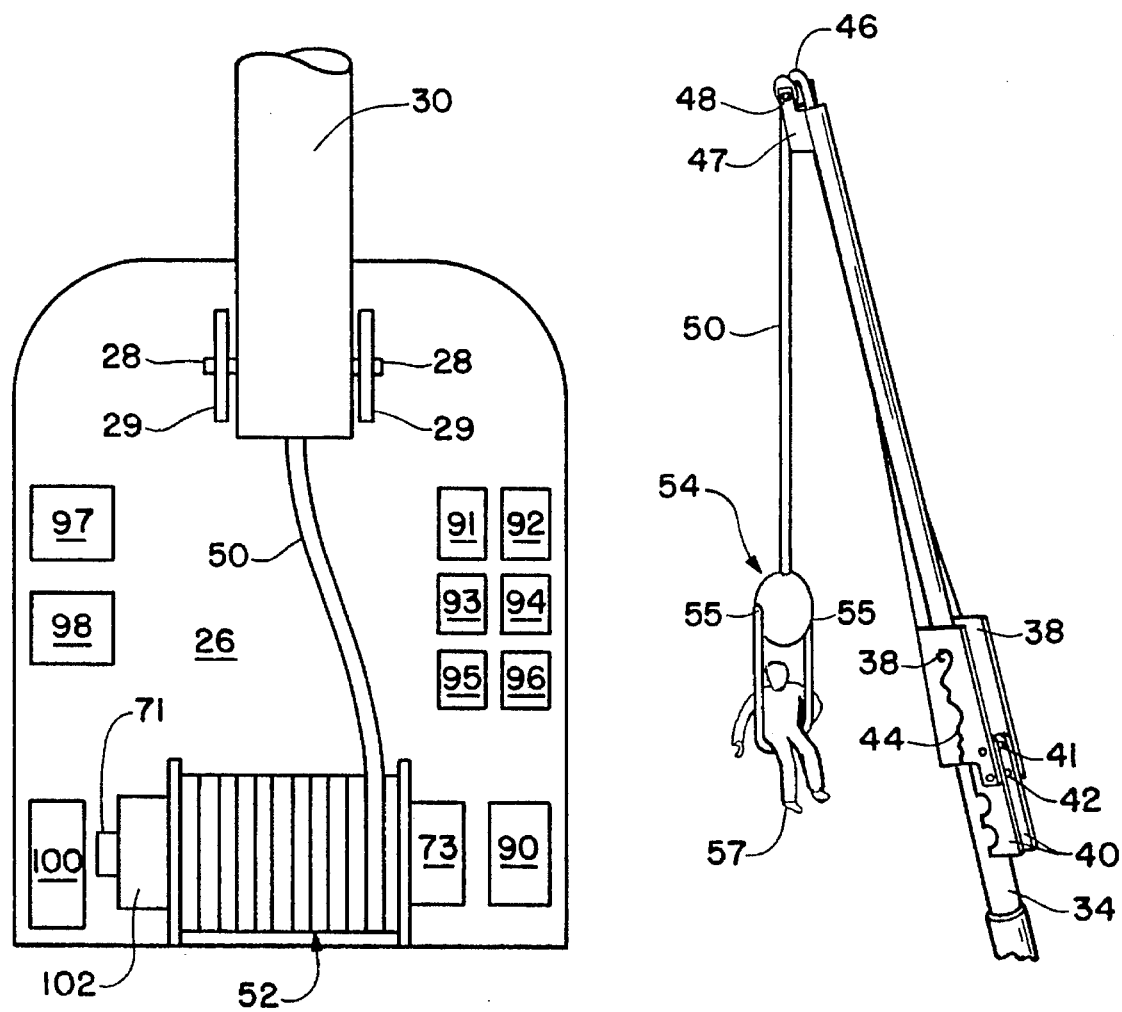
FIGURE 2B
FIGURE 3

SYSTEM FOR REMOTELY CONTROLLING THE UNREELING AND TAKE-UP OF A HOSE ON A REEL

BACKGROUND OF THE INVENTION invention relates to reels and more specifically to a system for remotely controlling the unreeling and take-up of a hose on a reel. Existing equipment will be described that primarily relates to that which is available for tree surgeons who work from lines high above the ground in order to perform tree trimming operations and applying pesticides.

Tree trimmers start their job from the top of the tree and work their way down the tree. When they do that, they stand on limbs that should have enough strength to support part or all of their weight. In this manner the trimmer can work his way around the tree cutting limbs while standing on tree limbs most of the time.

When a tree trimmer has a tree that is too tall for his bucket truck, he has to throw a rope over a limb and pull himself up to a first position. He then throws the rope over another limb until he works himself up to the top of the tree. This allows him to trim the top of the tree after which he puts his rope around the limb and works his way down.

There are very few boom trucks that reach over 100 feet. Most of the trucks have booms that articulate, so they are bending back and forth. When a tree is being trimmed, the bucket must be moved to every position they need to perform the work. The truck operator has to maneuver both booms to get to a position the trimmer needs to trim.

Tree trimmers must be very careful when trimming branches and limbs close to power lines. If a metal part of the boom touches the power line, they are in trouble. When doing tree jobs, some tree surgeons ride the ball and it is important that they be in constant radio contact with the operator of the crane. It is dangerous during this operation because the crane operator cannot always see the tree trimmer. The tree trimmer must put the safety his life in the trust of the crane operator.

It is an object of the invention to provide a novel tree trimming system that is safer than existing systems.

It is also an object of the invention to provide a novel tree trimming system that employees a novel reel assembly.

It is another object of the invention to provide a novel tree trimming system that gives the tree trimmer total control of his movements, by mechanical equipment when hooked up to a line high over the ground.

It is a further object of the invention to provide a novel tree trimming system that allows items such as compressed air, oxygen, paint, pesticides, etc. to be delivered to his operating station above the ground through the tubular hose that is supporting him above the ground.

It is an additional object of the invention to provide a novel tree trimming system that can also be used in emergency evacuation situations such as rescue operations.

It is also an object of the invention to provide a novel tree trimming system that uses a novel support hose structure.

SUMMARY OF THE INVENTION

The novel system for remotely controlling the unreeling and take-up of a hose on a reel has a major application when used on a crane truck. The crane truck has a bed and a turntable platform would be rotatably mounted about a vertical axis. The turntable platform would be supported on a base secured to the truck bed. A telescoping boom assembly has its bottom end pivotally secured to support structure on the turntable platform. A hydraulic cylinder assembly has its bottom end pivotally secured to the turntable platform and its top end pivotally secured to the bottom boom section. The hydraulic lift cylinder assembly controls the angular orientation of the boom assembly with respect to the truck bed.

The telescoping boom assembly would preferably have at least five telescoping boom sections and these would be extended and retracted by a conventional state of the art, cable and pulley system such as used by Skyhook (Reg. Trademark) aerial cranes. The cable is wound-in or let out by a D.C. traction type motor that winds and unwinds the cable from a reel. All of the boom sections are tubular and a 10 foot manually retractably insulated boom extension is attached to the top end of the top boom section.

The insulated boom extension has a pair of laterally spaced side plates adjacent its bottom end that are pinned to a pair of laterally spaced mounting plates on the top end of the top boom section. By removing one of the pins, the boom extension can be rotated 180 degrees rearwardly and brought into close contact with the telescoping boom assembly when it is stored for travel. A sheave or pulley is mounted adjacent the top end of the boom extension.

The novel reel assembly is also mounted on the top of the turntable platform. The reel itself has a pair of laterally spaced sidewalls that are connected together by a barrel or drum. A hollow axle passes through the center of the barrel and extends beyond the respective side walls of the reel. The opposite ends of the axle are journaled in the top ends of support walls extending upwardly from the turntable platform. The right side extension portion of the axle has a rotating union having nine places on it. The first place is connected to an air compressor that is mounted on the turntable platform. The other eight places are connected to auxiliary medium delivery lines whose opposite ends are connected to containers or housings containing oxygen, paint, pesticides, fuel, oil, etc.

These containers and housings are also mounted on the turntable platform. The left side extension portion of the axle includes structure for rotating the axle such as a conventional motor and gears that would also be supported on the turntable platform and position within the motor housing. Also mounted on this end of the axle is the base fiber optic modem and a slip-ring assembly having 12 places. The first two places are electrically connected to a generator mounted on the turntable platform. The generator supplies the base fiber optic modem with its electrical power. The other respective slip-ring places are connected electrically to the different motors and pumps that would, 1) activate the turntable to rotate to its left or its right, 2) activate the boom assembly to extend or retract, 3) raise the angle of the boom upwardly or lower it with respect to the turntable platform, 4) rotate the reel to unreel the hose or rotate it the other direction for reeling up the hose, and 5) two speed control places that would control the various respective motors and pumps and run them at speeds in a range of 1–10 where 1 is slow and 10 is very fast.

Most of the time, between 400 to 600 feet of hose would be used with the reel and telescoping boom assembly. One example of the type of hose used is sewer hose that has been covered with a polyester jacket. This hose is about 2⅛ inch in diameter. Extending the length of the hose inside it would be a high pressure line through which a fluid such as air or water could be pumped. This high pressure line would have an outside diameter of approximately ¾ of an inch. An annular chamber is formed between the outside surface of the high pressure pneumatic line and the inside wall surface of the hose. Eight auxiliary medium delivery lines and two fiber optic lines would also extend the length of the hose in this annular chamber.

The bottom end of the hose would be secured to the reel and the two fiber optic lines would pass through a slot in the side wall of the hollow axle and pass through the interior of the hollow axle until they would be connected to the base modem. There would be a second elongated slot in the side wall of the hollow axle. The high pressure pneumatic line and the eight auxiliary medium delivery lines would pass through this slot into the interior of the axle. Their ends would be connected to the respective eight places on the rotating union that are connected to the auxiliary medium containers. The high pressure pneumatic line would be connected to the first place on the rotating union that is in turn connected to the compressor mounted on the turntable platform.

The top end of the hose passes around the sheave at the top of the boom extension and drops downwardly and has a connection housing mounted at its bottom end. Inside the connection housing is a fiber optic modem that is connected to the two fiber optic lines that pass along the length of the hose. Quick attachment connections would also be found on the ends of the respective auxiliary medium delivery lines and the high pressure pneumatic line in the connection housing. This allows the pneumatic line to deliver pneumatic power for pneumatic tools that the tree trimmer would use one of the medium delivery lines could be an air line that supplies the operator oxygen at his work station. The other respective delivery lines could supply paint, pesticides, fuel, oil, etc.

The tree trimmer would be supported in a tree saddle whose opposite ends would be attached to clips extending from the opposite sides of the connection housing. The tree trimmer would wear an operator's control vest having two front pockets. A control console would be kept in one pocket and it would be connected to the satellite modem. A battery pack supply would be kept in the other pocket and it would be connected to the satellite modem to provide power for transmitting signals down to the base modem.

The telescoping boom has been designed to give it an approximate maximum height of 150 feet. This generally allows the tree trimmer to be raised to a position above the tree. He can lower himself downwardly and then he can start trimming the tree from the top. This allows the tree trimmer to support most of his weight on the tree limbs as he is performing his tasks. The hose supporting the tree trimmer has not been designed to lift any weight other than a man. The polyester sewer hose is rated at 8000 psi tensile strength and the minimum requirement for a man lift is 6500 psi. The operator is capable of making instantaneous moves by operating the control console he caries in his vest pocket. He can tell the boom assembly to go up or down and control the speed at which it moves. Likewise, he can tell the motor to rotate the turntable to the left or to the right and the speed it should travel. He can also direct the hydraulic lift cylinder assembly to lift the boom up or lower it and at the speed he desires. Additionally, he may tell the spool or reel to take-up line or to let line out at a speed that he can control.

The use of the auxiliary median delivery lines allows the static weight that is being supported by the hose to be minimized. Everything that the operator is using is on the truck and all of his supplies for his air compressor is on the truck. The paint supply, the pesticides, and his breathing scrubbing unit is on the truck and, are all being delivered to him at his operating station.

The novel system incorporates two fail safe systems in case the tree trimmer gets into trouble. The first fail safe system allows a man on the ground to manually disconnect the hydraulic drive from the reel. At this point, the reel would be in a freewheeling condition except that there is a brake attached. The man on the ground then loosens the brake enough until he can comfortably turn the reel by hand to its rotation to lower the man to the ground.

An example of when the fail safe system could be used is when the hose supporting the saddle becomes tangled or fouled. The saddle is equipped with a 175 foot length of cord such as a chalkline and it has a weight on its end. The weight can be lowered to the ground with a hook on it. The man on the ground would attach the hook to a ½ inch thick climbing rope. The tree trimmer then pulls his cord back up to the saddle with the end of the climbing rope. He takes the end of the rope and threads it through the clips on the connections housing. Next the tree trimmer ties a monkey first and comes down the rope on a loop.

There would also be two sets of control consoles for the system. One would be with the tree trimmer in his nest. The second control console is located adjacent the reel. A situation where the second control console might be needed is when the tree trimmer bumps his head or is injured to the extend that he can't operate his control console the man on the ground can hit the override and then he would have all the functions available that the man up in the saddle had.

The novel system also has many different applications other than for use by a tree trimmer. The boom may be extended out over a cliff in rugged terrain to lower people for search and rescue operations. It could have applications for fire fighting units that have reels mounted on a truck having a big water tank. The firemen could take the hose down a hillside with them and deliver water to the fire. With the incorporated fiber optics lines and air line oxygen delivery system in a fire hose, he could be delivering water for the fire and be receiving oxygen from the truck and controlling whether the hose is to be reeled-in or unreeled.

DESCRIPTION OF THE DRAWINGS

FIG. 2B is a schematic top plan view of the turntable platform and the various structures that are mounted thereon;

FIG. 3 is an enlarged view taken along circular line 3—3 of FIG. 2;

FIG. 5 is a cross sectional view taken along lines 5—5 of FIG. 4;

DESCRIPTION OF THE PREFERRED EMBODIMENT

Figures 1, 2A:
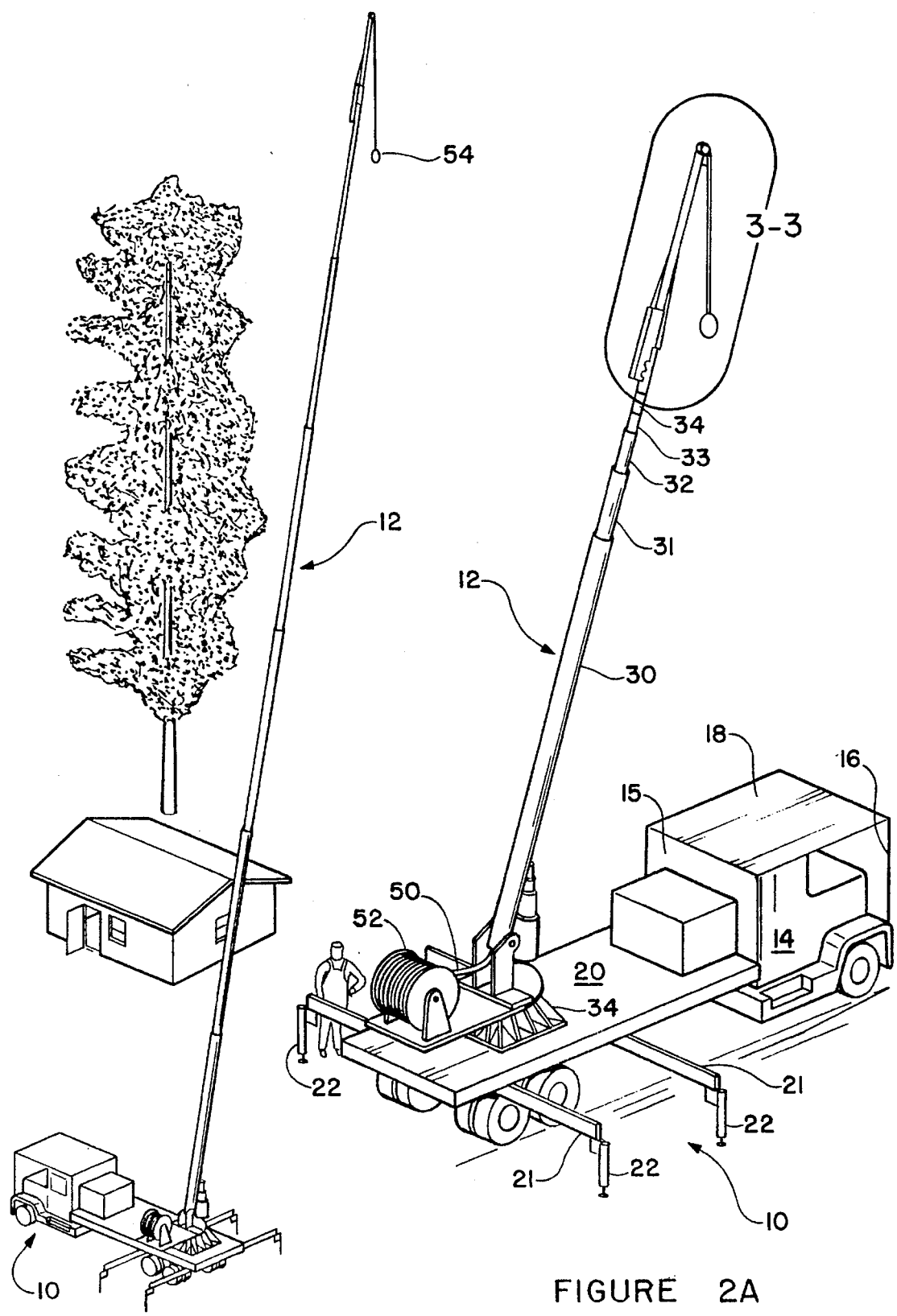
FIG. 1 illustrates the manner in which the novel system would be used for trimming a tree.
FIG. 2A illustrates the crane truck with the telescoping boom assembly in its retracted position.

The novel system for remotely controlling the unreeling and take-up of a hose on a reel will now be described by referring to FIGS. 1–7 of the drawings. FIG. 1 illustrates a crane truck 10 on a job site with the telescoping boom assembly 12 in its extended state above the top of the tree to be trimmed or treated. The top of the telescoping boom assembly would be approximately 150 feet above the ground.

Crane truck 10 has a cab 14 and a support panel 15 is mounted immediately behind it. A pair of posts 16 attached to the front of the cab combine with support panel 15 to support an overhead platform 18 upon which the telescoping boom assembly 12 rests when being transported. Crane truck 10 has a bed 20 having telescoping side board arms 21. Legs 22 extend down from their ends and are adjustable for bracing the truck when the telescoping boom is in its extended state. A base 24 is mounted on bed 20 and it supports turntable platform 26 that would be pivotable about a vertical axis by conventional state of the art shafts, gears and a motor.

The bottom end of telescoping boom assembly 12 is pivotally mounted by pins 28 in laterally spaced side support walls 29 that are secured to turntable platform 26. Telescoping boom assembly 12 has a bottom boom section 30, intermediate boom sections 31, 32, 33 and a top boom section 34. A hydraulic lift cylinder assembly 36 has its bottom end pivotally secured to turntable platform 26 and its top end pivotally secured to bottom boom section 30. Hydraulic lift cylinder assembly 36 would be operated by a conventional hydraulic pump to raise and lower the vertical angle of the telescoping boom assembly 12.

The top end of telescoping boom assembly 12 is illustrated in FIG. 3. A ten foot manually retractable insulated boom extension 36 has a pair of laterally spaced side plates 38. A pair of laterally spaced mounting plates 40 are mounted on the top boom section 34 and pins 41 and 42 connect the respective members together. By removing pin 41, the boom extension 36 can be pivoted rearwardly 180 degrees to a folded position for travel. A safety line 44 has its opposite ends connected to side plates 38 and mounting plates 40. A pulley or sheave 46 is mounted on passing a shaft or pin 48 passing through a bracket 47 adjacent the top end of boom extension 36. Hose 50 that is coiled on reel assembly 52 passes upwardly through the interior of the respective boom sections and then over sheave 46 and then downwardly with its bottom end attached to connection housing 54. Attachment clips 55 are secured to the outer surface of connection housing 54. The opposite ends of a tree saddle 56 are latched into the respective clips 55 and its supports the operator/tree trimmer 57.

Figure 6:
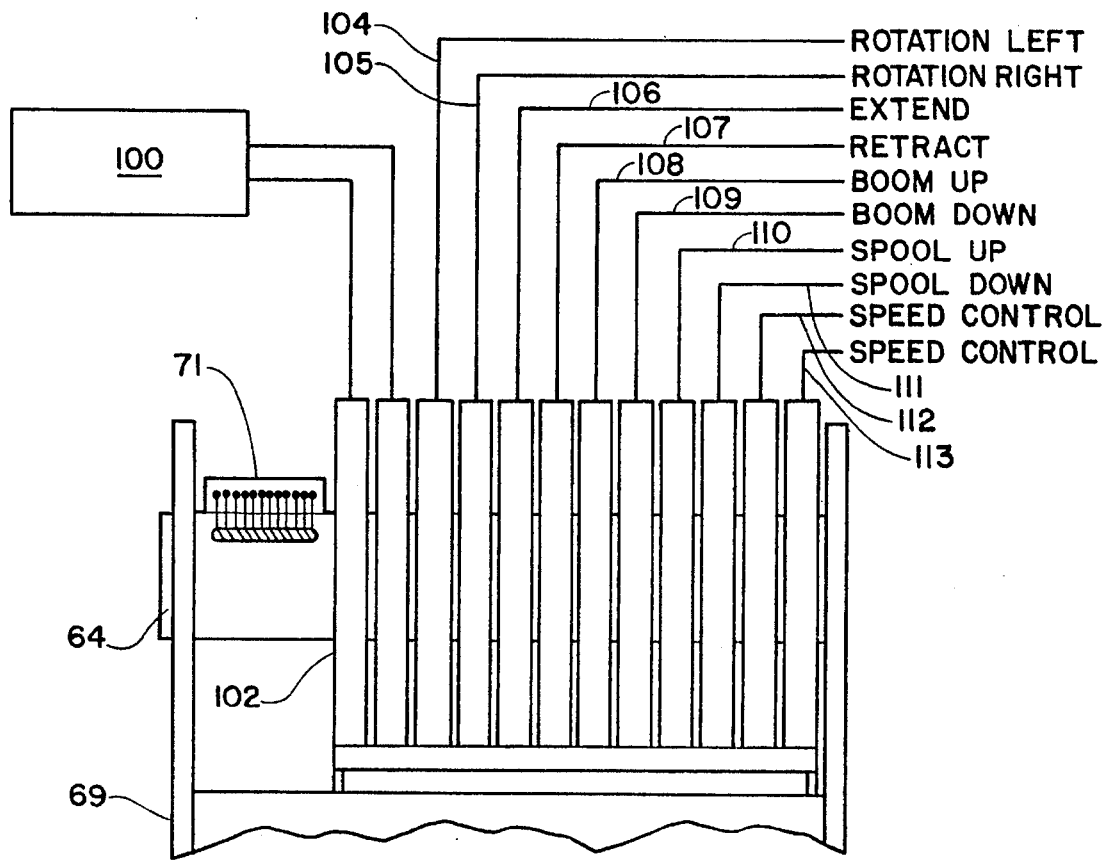
FIG. 6 is an enlarged schematic view taken along circular line 6—6 of FIG. 4.
Figure 4:
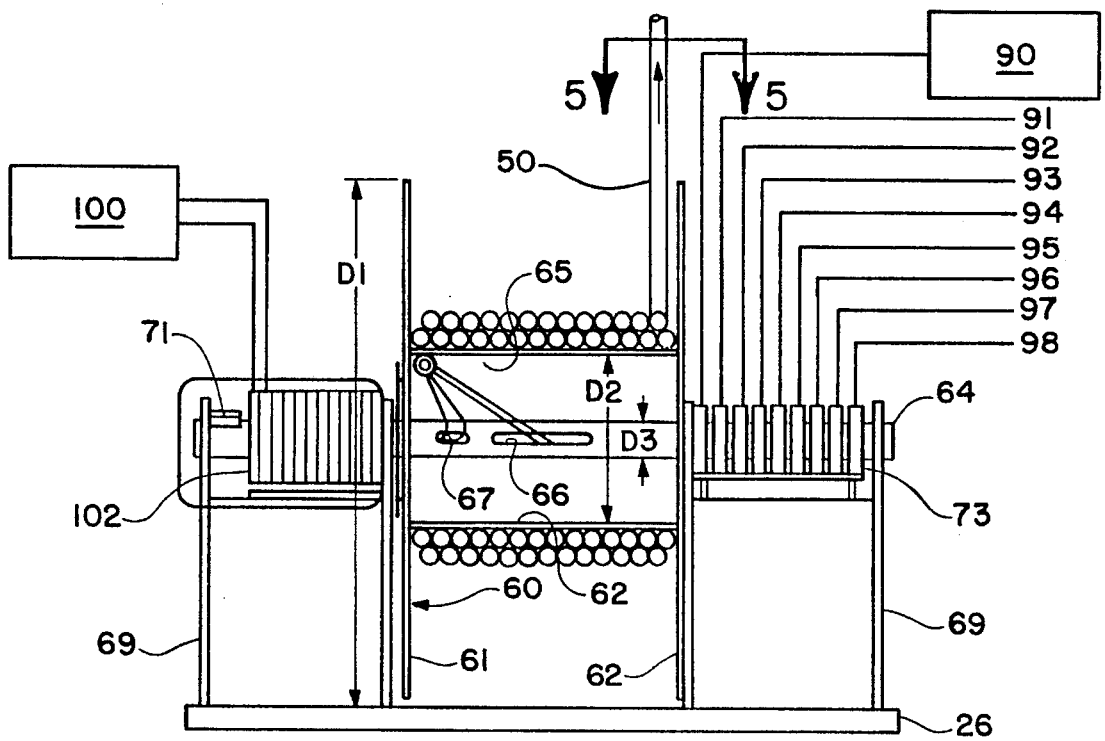
FIG. 4 is a schematic front elevation view of the novel reel assembly.

Reel assembly 52 is best understood by referring to FIGS. 4–6. Reel 60 has a pair of laterally spaced side walls 61 that are connected together by a barrel or drum 62. Side walls 61 have a height D1 and drum 62 has an interior height D2. A hollow axle 64 passes through the center of reel 60 and extends past the respective side walls 61. Axle 64 has an outside diameter D3 and a chamber 65 is formed between drum 62 and axle 64. Slots 66 and 67 are formed in axle 64. The outer ends of axle 64 are journaled in the top end of support walls 69. A base fiber optic modem 71 and a slip ring having 12 places are mounted on the left end of axle 64. A rotating union having 9 places is mounted on the right end of axle 64.

Hose 50 is a conventional sewer hose having a polyester composite weight-bearing outer jacket. Hose 50 has an outside diameter D4 and an inside diameter D5. A high pressure pneumatic line 75 passes through the interior of hose 50 and it has an outside diameter D6. The annular space between high pressure pneumatic line 75 and hose 50 is filled by two fiber optic lines 77 and 78. Auxiliary medium delivery lines 80–88 also pass through the annular space between the respective hoses 50 and 75.

High pressure pneumatic line 75 and auxiliary medium delivery lines 80–88 pass through slot 66 in axle 64 and have their ends connected to the respective 9 places of rotating union 73. The first place of the union connects high pressure pneumatic line 75 to air compressor 90. Auxiliary medium delivery lines 80–88 are connected to the respective eight places of rotating union 73 and these are respectively connected to containers 91–98 that may contain mediums such as oxygen, paint, pesticides, fuel, oil, chemicals, etc. See schematic FIG. 2B.

Fiber optic lines 77 and 78 pass through slot 67 of axle 64 and have their ends connected to fiber optic base modem 71. A generator 100 is connected by two of the places slip-ring 102 to fiber optic base modem 71. Electrical lines 104 and 105 are connected between two of the slip-ring places and the controls that direct turntable platform 26 to rotate left or right. Electrical lines 106 and 107 are connected to the controls that direct telescoping boom assembly 12 to extend or retract. Electrical lines 108 and 109 are connected to hydraulic lift cylinder assembly 36 that controls the up and down travel of the boom. Electrical lines 110 and 111 are connected to the control that directs a motor to wind cable 50 in or out on reel 60. Electrical lines 112 and 113 are connected to speed controls that are in turn connected to each of the respective lines 104–111 to control the speed at which they operate.

Figure 7:
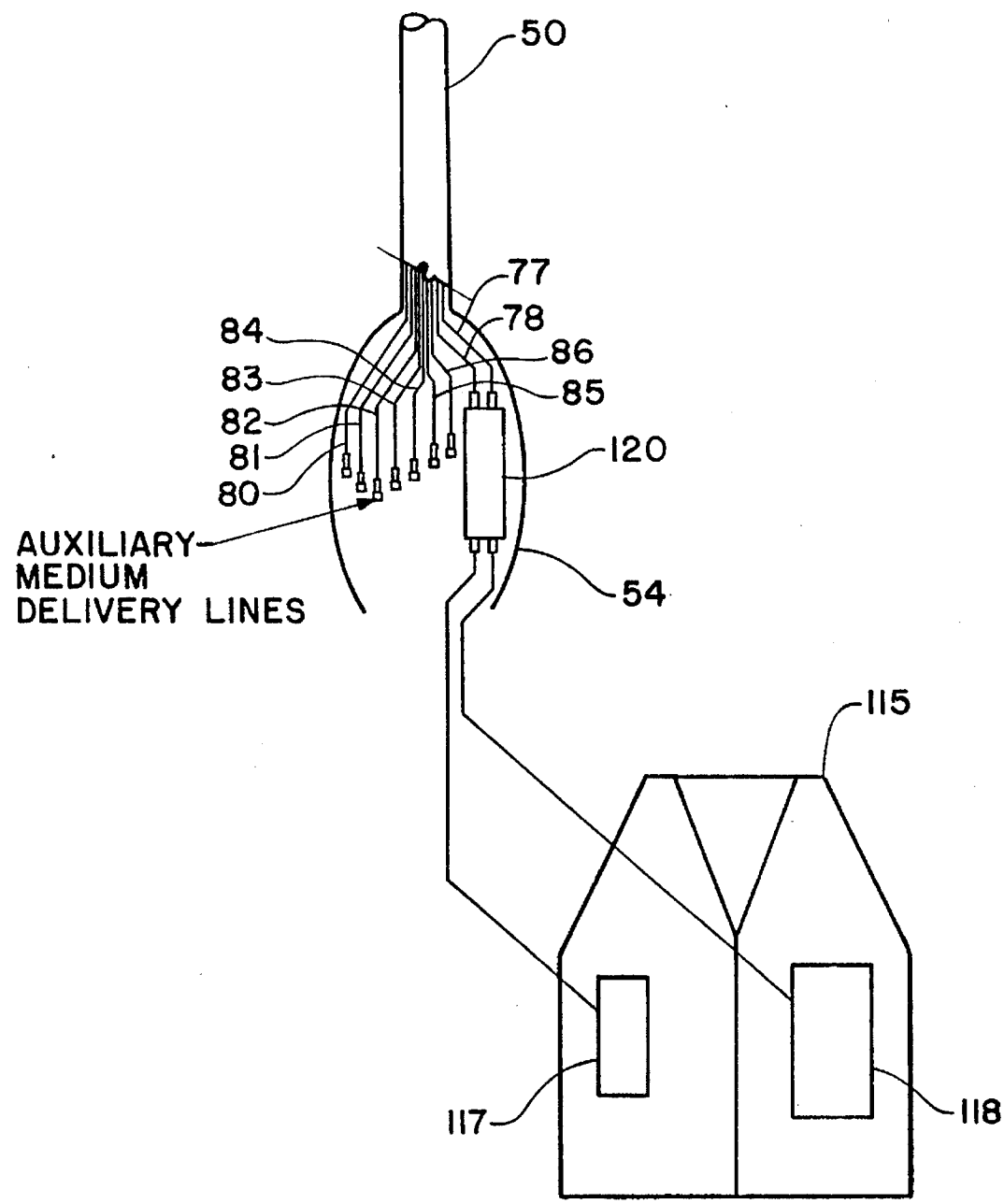
FIG. 7 is an enlarged schematic view of the top end of the cable and the vest worn by the tree trimmer.

FIG. 7 illustrates the operator's control vest 115 that he wears. It has a pair of pockets in its front for holding battery packed power supply 117 and control console 118. These respective units are connected to fiber optic satellite modem 120 that is positioned within connection housing 54. The top ends of auxiliary medium delivery lines 80–88 and high pressure pneumatic line 75 have connections at their top ends in connection housing 54. This allows pneumatic tools such as power saws, drills, etc. to be quickly attached thereto. Also devices such as paint sprayers, pesticide sprayers, oxygen masks, etc. can be connected to the respective medium lines.

What is claimed is:

1. A system for remotely controlling the un-reeling and take-up of a hose on a reel comprising:

a reel having a pair of laterally spaced side walls rigidly connected together by a tubular drum, said side walls having a diameter D1 and said tubular drum having an inside diameter D2; said reel being rigidly mounted on a tubular axle having an outer diameter D3, said tubular axle having at least one aperture in its side wall to provide communication with its interior; said axle extending from the side walls of said reel;

support means for the opposite end of said axle, said opposite ends of said axle being journaled in said support means so that it can rotate;

a primary power source and means connecting it to said axle to provide rotational motion;

an elongated hose having a length L1, a rear end, an outer diameter D4 and an inner diameter D5; at least part of said hose being coiled on said reel with the rear end of said hose being connected to the interior of the tubular drum of said reel;

an elongated tubular high pressure line having an outside diameter D6 and it is located in said hose and extends at least the length of said hose, said high pressure line having a front end and a rear end; D6 is less than D5 by a predetermined amount to form an annular chamber that extends the length of said hose between the outer surface of said high pressure line and the inner diameter of said hose;

a plurality of secondary lines extending at least the length of said hose, said secondary lines passing through the annular chamber of said hose and they each have a front end and a rear end;

two of said secondary lines being fiber optic lines, the rear ends of said fiber optic lines being connected to a base modem, a source of electrical power is connected to said base modem, the front ends of said fiber optic lines being connected to a satellite modem;

a source of fluid and means for connecting it to the bottom end of said high pressure line; and a control console connected to said satellite modem; said control console having means for a) directing said primary source to reel out said hose or reel in said hose, b) transmit fluid from said source of fluid through said high pressure line to its front end, and c) means for controlling the speed of a) and b).

2. A system as recited in claim 1 wherein said hose has a polyester composite weight bearing outer jacket.

3. A system as recited in claim 1 wherein said source of fluid is an air compressor.

4. A system as recited in claim 1 wherein the support means for the ends of said axle are mounted on a turntable platform, and said turntable platform being rotatably mounted on a base, and a first power means for rotating said platform.

5. A system as recited in claim 4 wherein said control console has means for c) directing said first power means for rotating said platform to rotate said platform left or rotate said platform right and also to control its speed of rotation.

6. A system as recited in claim 4 further comprising a telescoping boom assembly, said telescoping boom assembly having a tubular bottom boom section whose bottom end is pivotally mounted about a substantially horizontal axis and supported on said turntable platform, a plurality of tubular boom sections that telescopically nest within each other including a top boom section, said elongated hose passing from the drum of said reel into the bottom end of said telescoping boom assembly and out its upper end, a second power means for extending and retracting said tubular boom sections when said reel has been directed to reel-out and reel-in said hose.

7. A system as recited in claim 6 wherein said control console has means for d) directing said second power means to extend or retract said telescoping boom assembly and also control its speed of movement.

8. A system as recited in claim 6 further comprising a hydraulic lift cylinder assembly having a top end and bottom end; means connecting its bottom end to said turntable platform and its top end to said bottom boom section.

9. A system as recited in claim 8 wherein said control console has means for e) directing said hydraulic lift cylinder assembly to rotate said telescoping boom assembly up or down and also so control its speed of movement.

10. A system as recited in claim 8 wherein said base is mounted on the bed of a crane truck.

11. A system as recited in claim 10 wherein said crane truck has a cab and an overhead platform is supported over said cab for supporting said telescoping boom assembly when it has been lowered for travel.

12. A system as recited in claim 6 further comprising an elongated insulated boom extension having a top end and a bottom end, said insulated boom extension being made of non-electrical conductive material; connecting means for attaching the bottom end of said boom extension to the top end of said top boom section.

13. A system as recited in claim 12 wherein said connecting means comprises a pair of laterally spaced mounting plates that are secured to said top boom section, a pair of laterally spaced side plates formed on said boom extension, removable pins securing said mounting plates and said side plates together and which allows said boom extension to be pivoted rearwardly 180 degrees and be stored against said telescoping boom assembly.

14. A system as recited in said claim 12 wherein said boom extension has a sheave mounted adjacent its top end and said hose passes around said sheave.

15. A system as recited in claim 6 wherein the top end of said hose, including the top ends of said secondary lines and said satellite modem are housed in a connection housing.

16. A system as recited in claim 15 further comprising a battery packed power supply and it is connected to said satellite modem.

17. A system as recited in claim 16 further comprising a vest to be worn by the operator of the system and said vest has a pocket for said control console and a pocket for said battery packed power supply.

18. A system as recited in claim 15 wherein said connection housing has connection clips and a tree saddle for supporting the systems operator is attached to said connection clips.

19. A system as recited in claim 6 wherein said source of fluid is an air compressor and it is mounted on said turntable platform.

20. A system as recited in claim 19 wherein the top end of said high pressure line has a connection on it that allows various pneumatic tools to be detachably connected thereto.

21. A system as recited in claim 6 wherein the electrical power source for said base modem is a generator and it is mounted on said turntable platform.

22. A system as recited in claim 6 further comprising a source of oxygen mounted on said turntable platform and it is connected to the bottom end of one of said secondary lines and the top end of that secondary line has a connection that allows it to be detachably connected to breathing apparatus.

23. A system as recited in claim 6 further comprising a paint storage container mounted on said turntable platform and it is connected to the bottom end of one of said secondary lines.

24. A system as recited in claim 6 further comprising a pesticide storage container mounted on said turntable platform and it is connected to the bottom end of one of said secondary lines.

\* \* \* \* \*